(12) United States Patent
Ogawa et al.

(10) Patent No.: US 10,583,714 B2
(45) Date of Patent: Mar. 10, 2020

(54) VEHICLE

(71) Applicant: HONDA MOTOR CO., LTD., Tokyo (JP)

(72) Inventors: Jun Ogawa, Saitama (JP); Shin Shigeoka, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 310 days.

(21) Appl. No.: 15/676,321

(22) Filed: Aug. 14, 2017

(65) Prior Publication Data

US 2018/0056752 A1 Mar. 1, 2018

(30) Foreign Application Priority Data

Aug. 24, 2016 (JP) .................... 2016-164011

(51) Int. Cl.
*B60H 1/26* (2006.01)
*B60H 1/24* (2006.01)
(Continued)

(52) U.S. Cl.
CPC ............. *B60H 1/246* (2013.01); *B60H 1/004* (2013.01); *B60H 1/00278* (2013.01); *B60L 58/26* (2019.02); *B60H 2001/003* (2013.01); *B60J 5/06* (2013.01); *B60K 1/04* (2013.01); *B60K 11/06* (2013.01); *B60K 2001/005* (2013.01); *B60K 2001/0422* (2013.01); *B60K 2001/0438* (2013.01); *B60L 50/64* (2019.02);
(Continued)

(58) Field of Classification Search
CPC ............ B60H 1/00278; B60H 1/00385; B60H 1/00392; B60H 2001/003; B60K 2001/0438

USPC .................................... 454/139–144
See application file for complete search history.

(56) References Cited

U.S. PATENT DOCUMENTS 4,533,370 A * 8/1985 Ikezaki ............... A47L 9/0081
15/326
2008/0062622 A1 3/2008 Fukazu et al.
(Continued)

FOREIGN PATENT DOCUMENTS

CN 102082309 A 6/2011
JP 2003-306045 A 10/2003
(Continued)

OTHER PUBLICATIONS

Mar. 20, 2018, Japanese Office Action issued for related JP Application No. 2016-164011.
(Continued)

*Primary Examiner* — Vivek K Shirsat
(74) *Attorney, Agent, or Firm* — Paratus Law Group, PLLC (57) ABSTRACT

A vehicle includes: a power equipment unit including a power equipment, a cooling mechanism for cooling the power equipment, and a case for accommodating the power equipment and the cooling mechanism; and an exhaust duct disposed on a floor panel, wherein the cooling mechanism discharges air, which has cooled the power equipment, into a passenger compartment through the exhaust duct. One end of the exhaust duct is connected to a duct connection portion of the case, and the other end of the exhaust duct is connected to a treading guard member which faces the floor panel to form a channel of air.

7 Claims, 9 Drawing Sheets

(51) Int. Cl.
    *B60L 58/26*      (2019.01)
    *B60H 1/00*      (2006.01)
    *B60K 1/00*      (2006.01)
    *B60K 1/04*      (2019.01)
    *B60L 50/64*      (2019.01)
    *B60K 11/06*      (2006.01)
    *B60J 5/06*      (2006.01)
    *B60R 3/00*      (2006.01)
    *B62D 25/20*      (2006.01)

(52) U.S. Cl.
    CPC ........... *B60R 3/002* (2013.01); *B60Y 2200/92* (2013.01); *B62D 25/2009* (2013.01); *Y02T 10/7005* (2013.01)

(56) References Cited

U.S. PATENT DOCUMENTS

| | | |
|---|---|---|
| 2010/0071980 A1 | 3/2010 | Kokaji et al. |
| 2010/0116568 A1* | 5/2010 | Kadoi ................ B60H 1/00278 180/65.1 |
| 2012/0326665 A1 | 12/2012 | Yin et al. |
| 2014/0166380 A1 | 6/2014 | Numasawa |
| 2015/0133041 A1 | 5/2015 | Kiya et al. |
| 2018/0015806 A1 | 1/2018 | Yasuda et al. |
| 2018/0050606 A1* | 2/2018 | Sugitate .................. B60L 58/24 |

FOREIGN PATENT DOCUMENTS

| | | |
|---|---|---|
| JP | 2008-062780 A | 3/2008 |
| JP | 2008-114706 A | 5/2008 |
| JP | 2008-201371 A | 9/2008 |
| JP | 2013-039895 A | 2/2013 |
| JP | 2013-244768 A | 12/2013 |
| JP | 2016-128289 A | 7/2016 |
| WO | WO 2013/061847 A1 | 5/2013 |
| WO | WO 2013/171797 A1 | 11/2013 |
| WO | WO 2016/125388 A1 | 8/2016 |

OTHER PUBLICATIONS

Sep. 2, 2019, Chinese Office Action issued for related CN Application No. 201710704681.3.

* cited by examiner

VEHICLE

CROSS-REFERENCE TO RELATED APPLICATION(S)

This application claims priority from Japanese Patent Application No. 2016-164011 filed on Aug. 24, 2016, the entire contents of which are incorporated herein by reference.

TECHNICAL FIELD

The present invention relates to a vehicle mounted with a power equipment unit which houses power equipment such as a vehicle driving battery.

BACKGROUND ART

A battery (battery module) is mounted on a hybrid vehicle which travels using an engine and a motor in combination, an electric vehicle which travels only using a motor, and the like to store electric power and supply the electric power to the motor.

In order to prevent performance degradation of the power equipment such as the battery due to abnormal temperature rise, these types of vehicles are provided with a cooling mechanism which maintains a temperature of the power equipment within an appropriate range. For example, a vehicle is disclosed in Patent Literature 1 in which power equipment disposed under a front seat is cooled with cooling air introduced from a passenger compartment and the cooling air after the cooling is exhausted to the passenger compartment.

In the vehicle disclosed in Patent Literature 1, an air introduction duct is connected to a battery case, which is located below the front seat, from a side step on one side, and an air discharge duct is connected to a side step on the other side from the battery case.

PRIOR ART LITERATURE

Patent Literature

[Patent Literature 1]: JP-A-2003-306045

SUMMARY OF THE INVENTION

Problem that the Invention is to Solve

A plurality of harnesses are arranged on a floor panel of a vehicle, and when the battery case and the side step are directly connected to each other by the duct member as in the vehicle disclosed in Patent Literature 1, the harness can hardly be routed in a front and rear direction. Further, when an end of the duct member is arranged in front of a connection destination in order to route the harness, the harness can be routed in the front and rear direction, but cracking, deformation, or the like may occur in the duct member when the end of the duct member is trodden by an occupant.

The invention provides a vehicle capable of routing a harness on a floor panel and suppressing cracking and deformation of an end of an exhaust duct.

Means for Solving the Problem

The present invention provides following aspects.

A first aspect is a vehicle (e.g., a vehicle 1 in embodiment) including:
a power equipment unit (e.g., a power equipment unit 20 in embodiment) including a power equipment (e.g., a battery 50 in embodiment), a cooling mechanism (e.g., a cooling mechanism in embodiment) for cooling the power equipment, and a case (e.g., a case 30 in embodiment) for accommodating the power equipment and the cooling mechanism; and
an exhaust duct (e.g., an exhaust duct 70 in embodiment) disposed on a floor panel (e.g., a floor panel 9 in embodiment), wherein
the cooling mechanism discharges air, which has cooled the power equipment, into a passenger compartment through the exhaust duct,
one end of the exhaust duct is connected to a duct connection portion (e.g., a duct connection portion 32 in embodiment) of the case, and
an other end of the exhaust duct is connected to a treading guard member (e.g., a treading guard member 80 in embodiment) which faces the floor panel to form a channel of air.

A second aspect is a vehicle (e.g., a vehicle 1 in embodiment) including:
a power equipment unit (e.g., a power equipment unit 20 in embodiment) including a power equipment (e.g., a battery 50 in embodiment), a cooling mechanism (e.g., a cooling mechanism in embodiment) for cooling the power equipment, and a case (e.g., a case 30 in embodiment) for accommodating the power equipment and the cooling mechanism;
a floor panel (e.g., a floor panel 9 in embodiment) having a power equipment containing portion (e.g., a power equipment unit containing portion 10 in embodiment) that houses the power equipment unit;
a slide door (e.g., a slide door 14 in embodiment);
a step (e.g., a step 15 in embodiment) that is disposed on the floor panel to be adjacent to the slide door; and
a rail accommodating portion (e.g., a rail accommodating portion S2 in embodiment) that is located below the step and provided with a rail (e.g., a rail 18 in embodiment) for guiding slide movement of the slide door, wherein
the cooling mechanism discharges air, which has cooled the power equipment, into a passenger compartment through the exhaust duct,
an exhaust path for exhausting air, which has cooled the power equipment, includes: a first exhaust path extending in a left and right direction from the case; and a second exhaust path connected to an interior of a passenger compartment from an under-step space (e.g., an under-step space S1 in embodiment) provided below the step through the rail accommodating portion,
the first exhaust path is constituted by an exhaust duct (e.g., an exhaust duct 70 in embodiment) disposed on the floor panel,
one end of the exhaust duct is connected to a duct connection portion of the case, and
an other end of the exhaust duct is connected to a treading guard member (e.g., a treading guard member 80 in embodiment) which faces the floor panel to form a channel of air.

A third aspect is the vehicle according to the first or second aspect, wherein
the treading guard member is provided, on a surface facing the floor panel, with a baffle plate (e.g., a baffle plate 85 in embodiment) configured to allow air to flow in a specific direction or a shielding plate (e.g., a rear surface 82 in embodiment) configured not to allow air to flow in a specific direction.

A fourth aspect is the vehicle according to any one of the first to third aspects, wherein the exhaust duct is provided with an intra-channel reinforcing portion (e.g., an intra-channel reinforcing portion 75 in embodiment) that connects an upper surface (e.g., an upper surface 70U in embodiment) and a lower surface (e.g., a lower surface 70D in embodiment) in the channel to each other in a height direction.

A fifth aspect is the vehicle according to any one of the first to fourth aspects, wherein the exhaust duct is integrally provided with an out-of-channel reinforcing portion (e.g., an out-of-channel reinforcing portion 76 in embodiment) separated from the channel.

A sixth aspect is the vehicle according to any one of the first to fifth aspects, wherein a resin pad is provided around the exhaust duct.

A seventh aspect is the vehicle according to the second aspect, wherein a height of the treading guard member is set to be substantially same as a height of the exhaust duct and a height of the step.

Advantage of the Invention

According to the first aspect, when the end of the exhaust duct is positioned on a motion line of a passenger, since cracking and deformation of the end of the exhaust duct can be prevented by the treading guard member, a blocking of the exhaust duct and an increase in pressure loss can be prevented. In addition, since the treading guard member faces the floor panel to form the channel, there is no need to extend the exhaust duct, and the harness can be routed on the floor panel to cross the exhaust path using the space located below the treading guard member.

According to the second aspect, since the air, which has cooled the power equipment, is exhausted to the rail accommodating portion which is the lowermost portion of the passenger compartment, the exhaust flow and the exhaust temperature can be smoothed, and the exhaust gas can be dispersed and gently introduced into the passenger compartment. Thereby, uncomfortable feeling to the occupant can be suppressed. Further, since the rail accommodating portion is the lowermost portion of the passenger compartment and is a portion having the lowest temperature in the passenger compartment because of being close to the slide door, the heat exchange efficiency is also improved by the exhaust to the rail accommodating portion.

In addition, when the end of the exhaust duct is positioned on a motion line of a passenger, since cracking and deformation of the end of the exhaust duct can be prevented by the treading guard member, a blocking of the exhaust duct and an increase in pressure loss can be prevented. In addition, since the treading guard member faces the floor panel to form the channel, there is no need to extend the exhaust duct, and the harness can be routed in a limited interior space of the passenger compartment to cross the exhaust path.

According to the third aspect, it can be prevented that the exhaust gas, which has cooled the power equipment, makes the passenger feel uncomfortable and it can be also prevented that the exhaust gas keeps discharging against a specific place and then the place is heated. Further, the exhaust gas can be made to flow smoothly in a desired direction, leading to a reduction in pressure loss.

According to the fourth aspect, since intra-channel reinforcing portion is provided in the channel of the exhaust duct, even when the exhaust duct is disposed on the motion line of the passenger, the blocking and the deformation of the exhaust duct can be suppressed, and the exhaust gas from the battery can smoothly flow in the direction of the slide door.

According to the fifth aspect, the strength of the exhaust duct can be further improved.

According to the sixth aspect, even if the exhaust leakage occurs, the exhaust can be relieved by the resin pad.

According to the seventh aspect, since the height of the treading guard member is set to be substantially the same as the height of the exhaust duct and the height of the step, the irregularities of the floor surface can be flattened.

MODE FOR CARRYING OUT THE INVENTION

Hereinafter, one embodiment of the present invention will be described in detail with reference to the accompanying drawings. Incidentally, the drawings are viewed in directions indicated by reference numerals. In the following description, a front and rear side, a right and left side, and a vertical side follow directions in which a driver views. In the drawings, the front side of the vehicle is indicated by Fr, the rear side is indicated by Rr, the left side is indicated by L, and the right side is indicated by R, the upper side is indicated by U, and the lower side is indicated by D.

Figure 1:
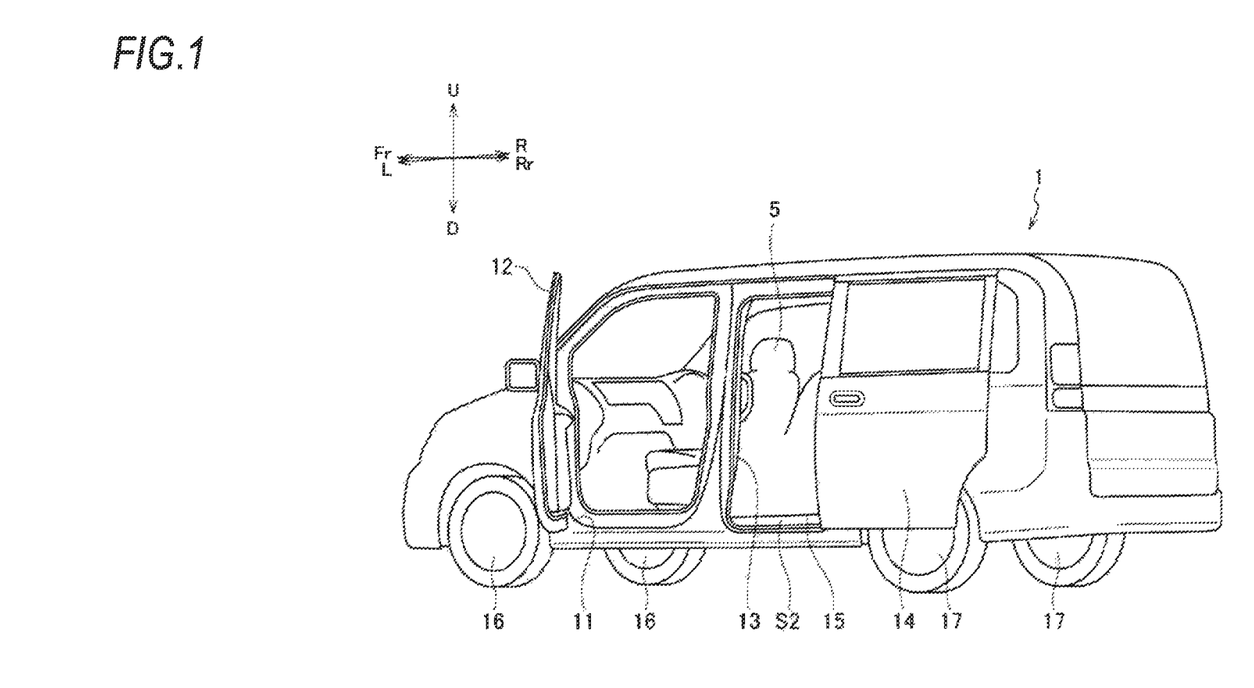
FIG. 1 is a perspective view of a hybrid vehicle according to an embodiment of the present invention as viewed from a left rear side.
Figure 2:
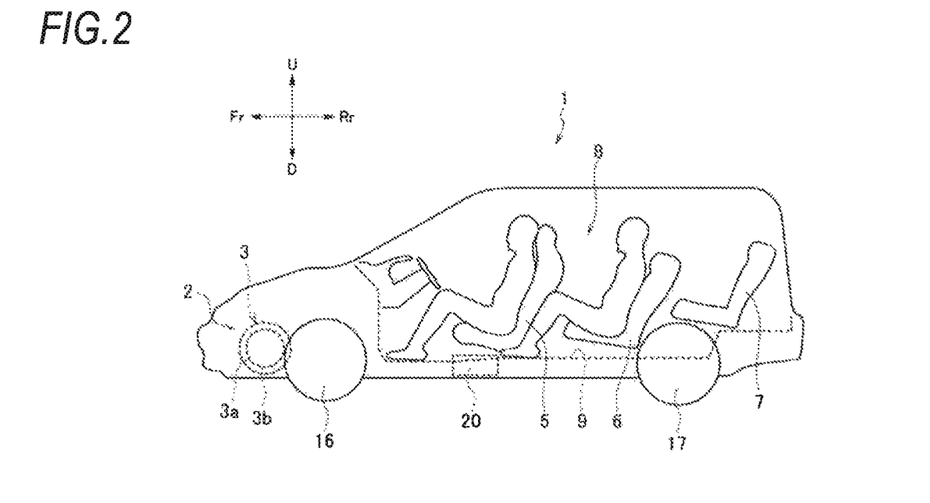
FIG. 2 is a schematic side view of the hybrid vehicle illustrated in FIG. 1.

FIG. 1 is a perspective view of a hybrid vehicle according to an embodiment of the present invention as viewed from a left rear side, and FIG. 2 is a schematic side view of the hybrid vehicle illustrated in FIG. 1.

The vehicle 1 is mounted with a power unit 3 in which an engine 3*a* and a motor generator 3*b* are installed in series in an engine room 2 at the front of the vehicle. For example, the motor generator 3*b* is a three-phase AC motor. The vehicle 1 is a hybrid vehicle which is driven by the engine 3*a* and/or the motor generator 3*b*, and is capable of recovering electric power from the motor generator 3*b* during vehicle deceleration and the like.

In the vehicle 1, a driving force of the engine 3*a* and the motor generator 3*b* is transmitted to a front wheel 16 which is a driving wheel. A rear wheel 17 is a driven wheel. In addition, when the driving force is transmitted from the front wheel 16 to the motor generator 3*b* during deceleration of the vehicle 1 and the like, the motor generator 3*b* functions as a generator to generate a so-called regenerative braking force so that kinetic energy of the vehicle 1 is recovered as electric energy. The recovered electric energy is charged in a battery 50 (see FIG. 3) through an electric power converter such as an inverter included in a high-voltage device to be described below.

At the rear side of the engine room 2, a passenger compartment 8 is provided in which a front seat 5, a middle seat 6, and a rear seat 7 are arranged.

Figure 8:
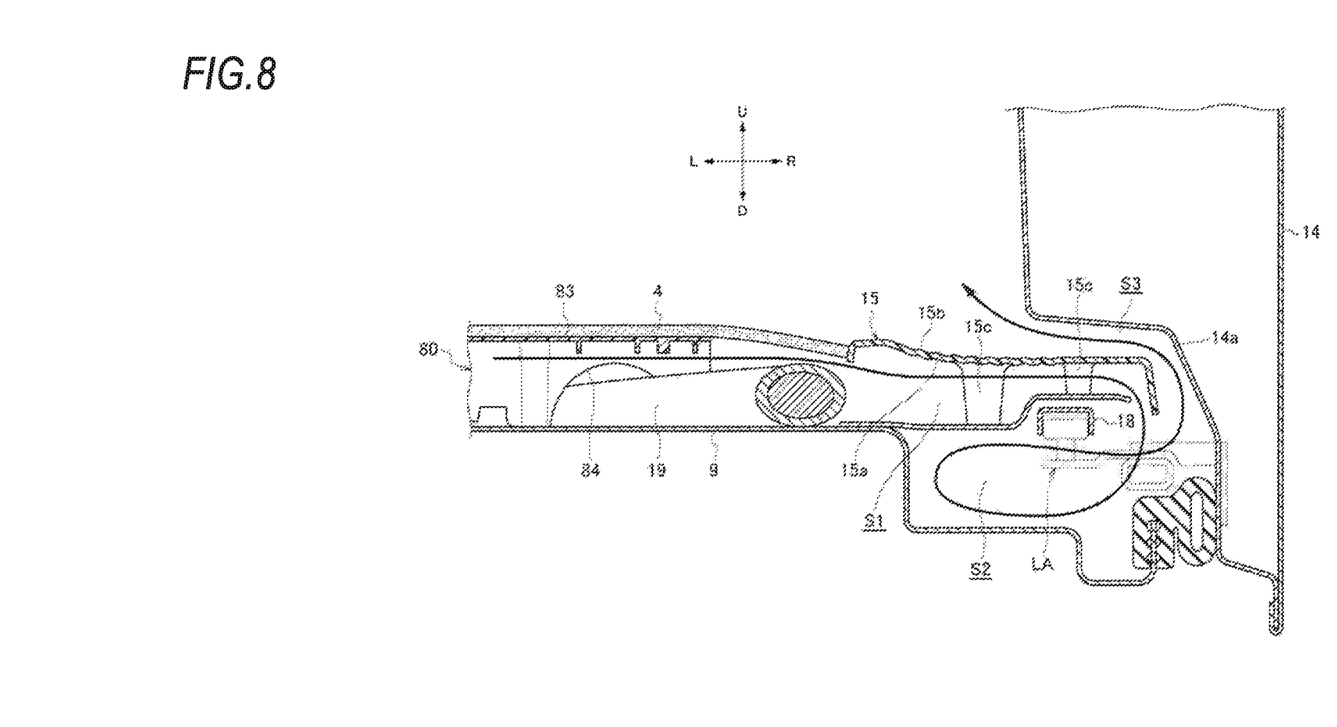
FIG. 8 is a sectional view taken along line C-C in FIG. 6.

Front side doors 12 are openably/closably supported in front door installation openings 11 formed in both sides of the front seat 5, and slide doors 14 are openably/closably provided in rear door installation openings 13 formed in both sides of the middle seat 6. The slide door 14 is slidably supported on a vehicle body by arms (only lower arm LA is illustrated in FIG. 8) provided on an upper part, a central part, and a lower part thereof.

In the rear door installation opening 13, a step 15 is provided on a floor panel 9 so as to be adjacent to the slide door 14, and a rail accommodating portion S2 provided with a rail 18 (see FIG. 18) for guiding the lower arm LA provided at the lower part of the slide door 14 is provided below the step 15.

Figure 3:
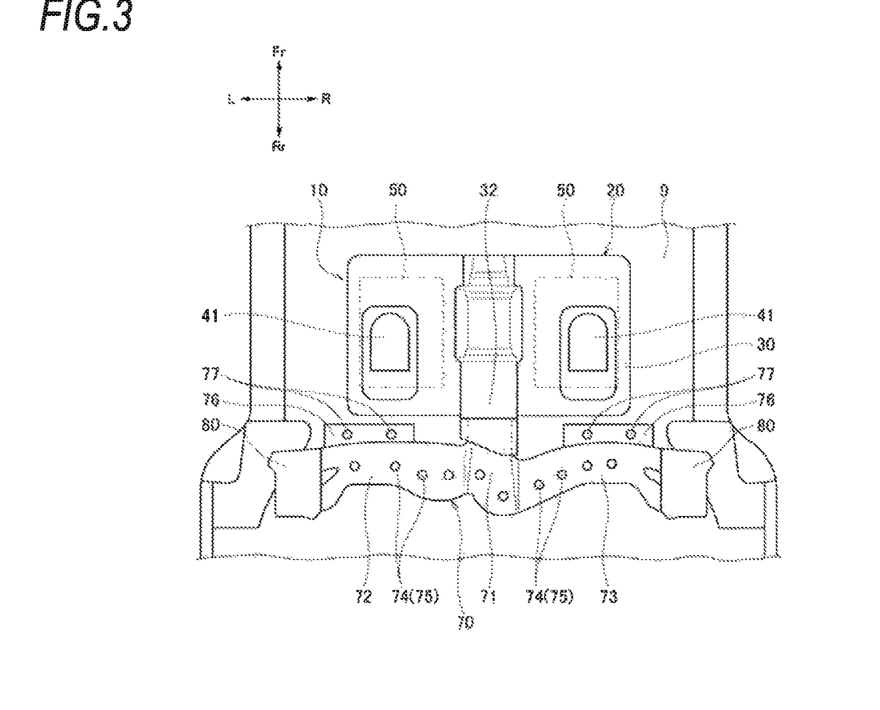
FIG. 3 is a plan view of a floor surface on which a power equipment unit, an exhaust duct, and a treading guard member are disposed.

As illustrated in FIG. 3, a power equipment unit containing portion 10 is provided in a recessed manner below the front seat 5 (driver's seat and passenger's seat) of the floor panel 9, and a power equipment unit 20 is housed in the power equipment unit containing portion 10. The power equipment unit 20 is a unit including the battery 50, a high-voltage device and a power distribution component (not illustrated) for controlling an electric power delivery of the battery 50, a main switch (not illustrated) for the battery 50, and a case 30 that houses these components, and is connected to the power unit 3 via a power cable (not illustrated).

The case 30 of the power equipment unit 20 has a box shape, and houses the battery 50, the high-voltage device, the power distribution component (high-voltage power distribution component) and the like.

Although not illustrated in detail, the battery 50 is provided in a state where a plurality of battery cells are bundled together. In addition, the high-voltage device is power equipment including an inverter having an inverter and a DC/DC converter. Power equipment such as ECU is also provided in the high-voltage device. Due to the function of the high-voltage device, direct current is obtained from the battery 50, the direct current is converted into three-phase alternating current, the current is supplied to the motor generator 3b to drive it, and regenerative current from the motor generator 3b is converted into direct current, thereby enabling the battery 50 to be charged.

A cooling mechanism is provided inside the power equipment unit 20 to cool down the battery 50 and the high-voltage device provided inside the case 30. The cooling mechanism introduces an air in the passenger compartment into the inside of the case 30 from a pair of air intake grills 41, which are provided at left and right sides of an upper surface of the case 30, using a cooling fan (not illustrated). After the air has cooled the battery 50 and the high-voltage device, the cooling mechanism exhausts the air into the passenger compartment from the other end of the exhaust duct 70 one end of which is connected to a duct connection portion 32 positioned at a center of a rear end of the power equipment unit 20.

The exhaust duct 70 is disposed along the floor panel 9 under the feet of the occupant sitting on the middle seat 6. The exhaust duct 70 branches from a branch portion 71 connected to the duct connection portion 32 into a left duct 72 extending leftward toward the left slide door 14 of the vehicle 1 and a right duct portion 73 extending rightward toward the right slide door 14 of the vehicle E A resin pad (not illustrated) such as felt is provided around the exhaust duct 70, and is covered with a carpet 4, together with the exhaust duct 70.

Figure 4:
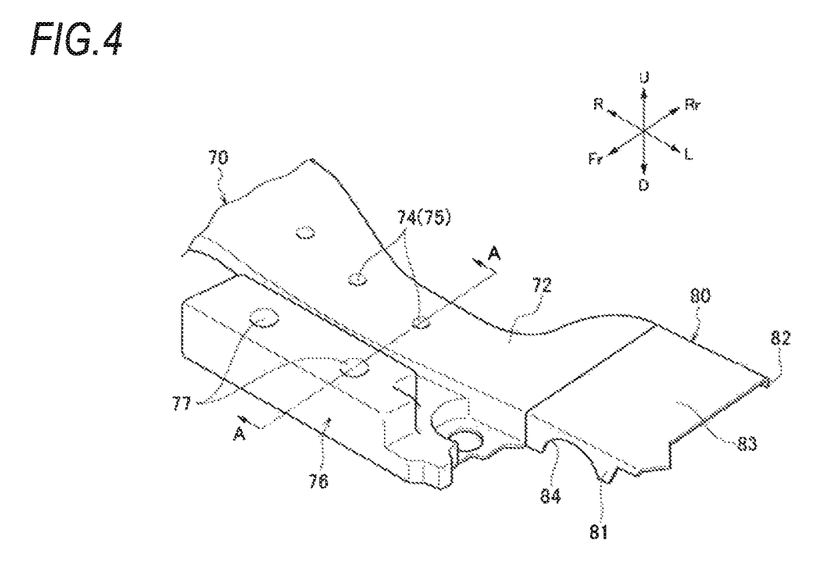
FIG. 4 is a partial perspective view of an exhaust duct and a treading guard member.
Figure 5:
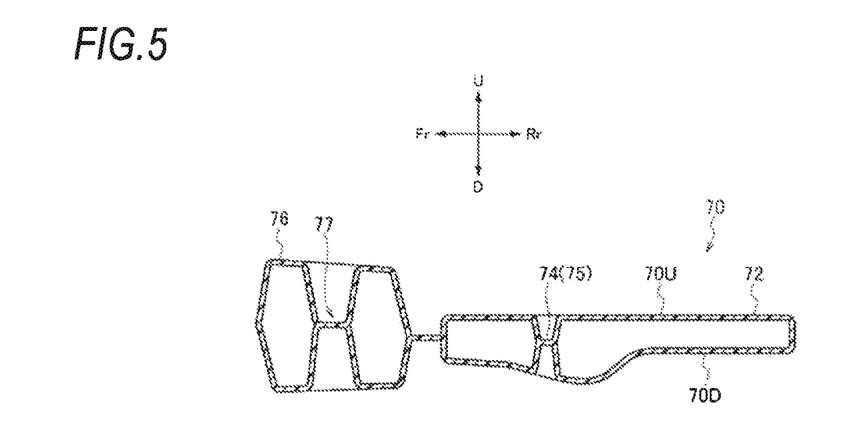
FIG. 5 is a sectional view taken along line A-A in FIG. 4.

Referring also to FIGS. 4 and 5, the left duct portion 72 and the right duct portion 73 each have substantially a rectangular cross-sectional shape, which has a transverse width longer than a height dimension, and is formed with an exhaust channel therein. Further, a plurality of upper and lower coupling portions 74 are provided in the left duct portion 72, the right duct portion 73, and the branch portion 71 along the channel direction to connect an upper surface 70I5 and a lower surface 70D in the channel to each other in a height direction. The upper and lower coupling portion 74 configures an intra-channel reinforcing portion 75 so that the exhaust channel is not deformed even when being trodden by the occupant.

In addition, the left duct portion 72 and the right duct portion 73 are integrally provided with out-of-channel reinforcing portions 76 separated from the exhaust channel. The out-of-channel reinforcing portions 76 are provided substantially at centers in the left and right direction of the left duct portion 72 and the right duct portion 73, respectively, and have a height dimension larger than that of the left duct portion 72 and the right duct portion 73. The out-of-channel reinforcing portion 76 is configured such that the toe of the occupant sitting on the middle seat 6 is located, and also functions as a footrest. The out-of-channel reinforcing portion 76 is also provided with upper and lower coupling portions 77 that connects the upper surface 70U and the lower surface 70D in the height direction.

As illustrated in FIGS. 3 and 4, treading guard members 80 are attached to tip portions of the left duct portion 72 and the right duct portion 73 respectively. The treading guard member 80 is a reinforcing member having a U-shaped cross section in which a front surface 81 and a rear surface 82 are coupled to each other by an upper surface 83, thereby preventing the tip portions of the left duct portion 72 and the right duct portion 73 from being deformed and cracked when being trodden by the occupant. Since a lower surface of the treading guard member 80 is not provided and the upper surface 83 thereof faces the floor panel 9, a harness 19 is allowed to be arranged in the U-shaped space. Reference numeral 84 denotes a harness opening formed in the front surface 81 of the treading guard member 80. A height of the treading guard member 80 is set to be substantially the same as the height of exhaust duct 70 and the height of the step 15.

Figure 6:
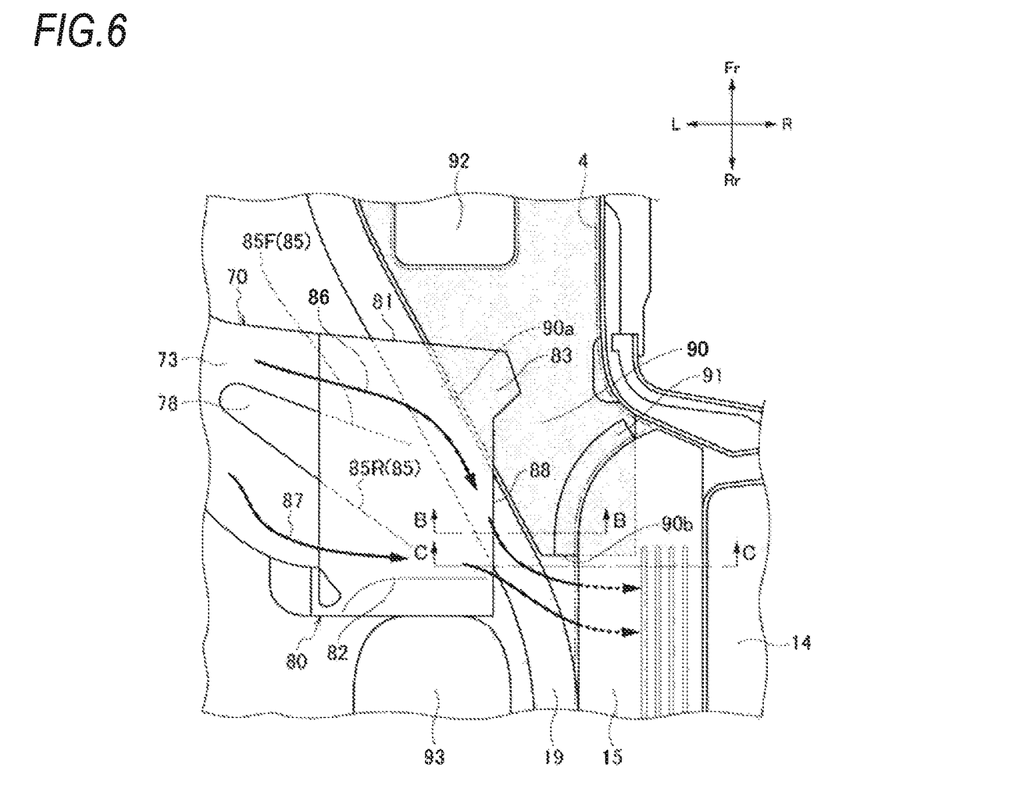
FIG. 6 is a plan view of main portions on a floor surface for explaining a flow of an exhaust gas.

As illustrated in FIG. 6, the tip portion of the treading guard member 80 is disposed so as to face a front part of the slide door 14 (rear door installation opening 13), that is, a front part of the step 15 in a vehicle width direction. In FIG. 6, reference numeral 92 denotes a seat rail of the front seat 5, and reference numeral 93 denotes a seat rail of the middle seat 6.

Subsequently, the flow of the air exhausted from the power equipment unit 20 will be described with reference to FIG. 3 and FIGS. 6 to 8.

The air exhausted from the power equipment unit 20 is divided into the left duct portion 72 and the right duct portion 73 at the branch portion 71 of the exhaust duct 70, and flows in the channels formed between the treading guard members 80 and the floor panel 9 through the channels formed in the left duct portion 72 and the right duct portion 73.

Two baffle plates 85 are extend downward from the upper surface 83 between the front surface 81 and the rear surface 82 of the treading guard member 80. Two baffle plates 85 are inclined from the front side to the rear side outward in the vehicle width direction so as to be continuous from baffle portions 78 formed at the tip portions of the left duct portion 72 and the right duct portion 73, and the left and right exhaust channels branches into a front channel 86 and a rear channel 87, respectively, which are directed toward the rear door installation opening 13 located rearward from the exhaust duct 70.

Figure 7:
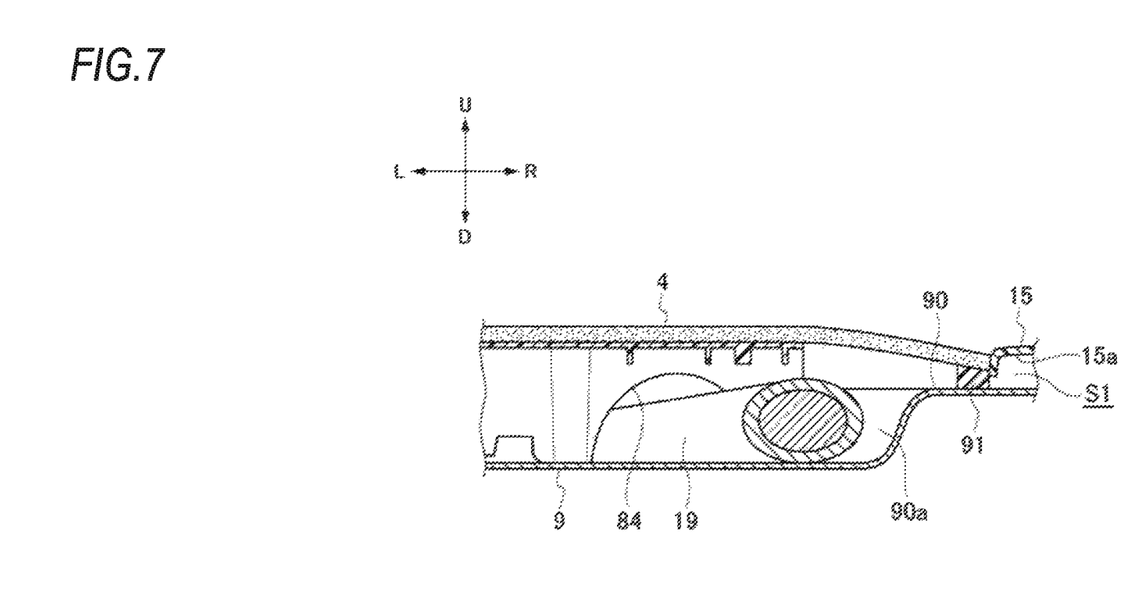
FIG. 7 is a sectional view taken along line B-B in FIG. 6.

A panel protrusion portion 90 (a hatched portion in FIG. 6) is formed on an area of the floor panel 9 a part of which is covered with the tip portion of the treading guard member 80. The panel protrusion portion 90 is inclined from the front side to the rear side of the vehicle outward in the vehicle direction. The front channel 86 is guided to the rear side of the vehicle and the outside in the vehicle width direction (to the rear door installation opening 13) by the front surface 81 of the treading guard member 80, an inward wall 90a of the panel protrusion portion 90, and the front baffle plate 85F. Further, a seal member 91 is provided on the carpet 4 covering the exhaust duct 70, the treading guard member 80, and the floor panel 9 along the contour of the step 15 to abut against the panel protrusion portion 90, thereby preventing the exhaust flow to an under-step space S1. Therefore, as illustrated in FIG. 7, the exhaust flowing in the front channel 86 does not flow into the under-step space S1 in the area where the seal member 91 is provided. The under-step space S1 is integrally formed on the back surface of the step 15 and is formed by a step support portion 15c abutting against the floor panel 9, as illustrated in FIG. 8.

The harness 19 disposed on the floor panel 9 is routed such that the harness 19 enters from the harness opening 84 formed in the front surface 81 of the treading guard member, passes below the treading guard member 80 along the inward wall 90a of the panel protrusion portion 90, and exits from a tip outlet 88 toward the rear side.

The rear channel 87 is guided to the rear side of the vehicle and the outside in the vehicle width direction (to the rear door installation opening 13) by the rear surface 82 of the treading guard member 80 and the rear baffle plate 85R. The rear surface 82 of the treading guard member 80 functions as a baffle plate and also functions as a shielding plate with respect to the seat rail 93.

As illustrated in FIGS. 6 and 8, the exhaust gas guided to the front channel 86 and the rear channel 87 is discharged from a rearward wall 90b, which is a rear end of the panel protrusion portion 90, to the rail accommodating portion S2 through the under-step space S1 which is a space partitioned by the back surface 15a of the step 15 and the floor panel 9. The rail accommodating portion S2 has a larger volume than the under-step space S1, and the exhaust gas is diffused in the rail accommodating portion S2. The air staying in the rail accommodating portion S2 returns to the passenger compartment through a gap S3 formed between the front surface 15a of the step 15 and an inside surface 14a of the slide door 14 when the slide door 14 is closed. In this way, the exhaust gas diffuses by passing through the rail accommodating portion S2, and the exhaust having no directivity returns to the passenger compartment.

As described above, according to this embodiment, when the end of the exhaust duet 70 is positioned on a motion line of a passenger, since cracking and deformation of the end of the exhaust duct 70 can be prevented by the treading guard member 80, a blocking of the exhaust duct 70 and an increase in pressure loss can be prevented. In addition, since the treading guard member 80 faces the floor panel 9 to form the channel, there is no need to extend the exhaust duct 70, and the harness 19 can be routed on the floor panel 9 to cross the exhaust path using the space below the treading guard member 80.

In addition, since the air, which has cooled the battery 50, is exhausted to the rail accommodating portion S2 which is the lowermost portion f the passenger compartment, the exhaust flow and the exhaust temperature can be smoothed, and the exhaust gas can be dispersed and gently introduced into the passenger compartment. Thereby, uncomfortable feeling to the occupant can be suppressed. Further, since the rail accommodating portion S2 is the lowermost portion of the passenger compartment and is a portion having the lowest temperature in the passenger compartment because of being close to the slide door 14, the heat exchange efficiency is also improved by the exhaust to the rail accommodating portion S2.

Further, since the treading guard member 80 is provided, on the surface facing the floor panel 9, with the baffle plate 85 configured to allow air to flow in a specific direction and the shielding plate (rear surface 821 configured not to allow air to flow in a specific direction, it can be prevented that the exhaust gas, which has cooled the battery 50, makes the passenger feel uncomfortable, and it can be also prevented that the exhaust gas keeps discharging against a specific place and then the place is heated. Further, the exhaust gas can be made to flow smoothly in a desired direction, leading to a reduction in pressure loss.

In addition, since the exhaust duct 70 is provided with the intra-channel reinforcing portion 75 that connects the upper surface 70U and the lower surface 70D in the channel to each other in the height direction, even when the exhaust duct 70 is disposed on the motion line of the passenger, the blocking and the deformation of the exhaust duct 70 can be suppressed, and the exhaust gas from the battery 50 can smoothly flow in the direction of the slide door.

Further, since the exhaust duct 70 is integrally provided with the out-of-channel reinforcing portion 76 separated from the channel, the strength of the exhaust duct 70 can be further improved.

In addition, since the resin pad is provided around the exhaust duct 70, even if the exhaust leakage occurs, the exhaust can be relieved by the resin pad.

Further, since the height of the treading guard member 80 is set to be substantially the same as the height of the exhaust duct 70 and the height of the step 15, the irregularities of the floor surface can be flattened.

Incidentally, the present invention is not limited to the above-described embodiment, but can be changed or improved properly.

For example, in the above-described embodiment, the power equipment unit containing portion 10 housing the power equipment unit 20 is provided below the front seat 5. However, the power equipment unit containing portion 10 may be provided below the middle seat 6 or below the rear seat 7 as well as below the front seat 5.

In addition, the battery 50 is exemplarily illustrated as power equipment. However, the power equipment is not limited to the battery, and may be an inverter, a DC/DC converter, and the like. In the power equipment unit, these components may be accommodated singly or in a combined form in a case.

In addition, the hybrid vehicle is exemplarily illustrated as the vehicle 1. However, the vehicle 1 is not limited thereto, and may be an electric vehicle, a fuel battery vehicle, and the like.

In addition, the power equipment unit 20, the exhaust duct 70, and the like are not limited to the above-described embodiment, and may adopt any configuration. For example, as illustrated in a modified example of FIG. 9, an air intake grill 41 is provided only on the right side of the upper surface of a case 30. In a power equipment unit 20 in which a duct connection portion 32 is provided on the left rear end of the power equipment unit 20, it may be configured to exhaust air into a passenger compartment after cooling a battery 50 and a high-voltage device from the other end of the exhaust duct 70 one end of which is connected to the duct connection portion 32 of the power equipment unit 20.

Figure 9:
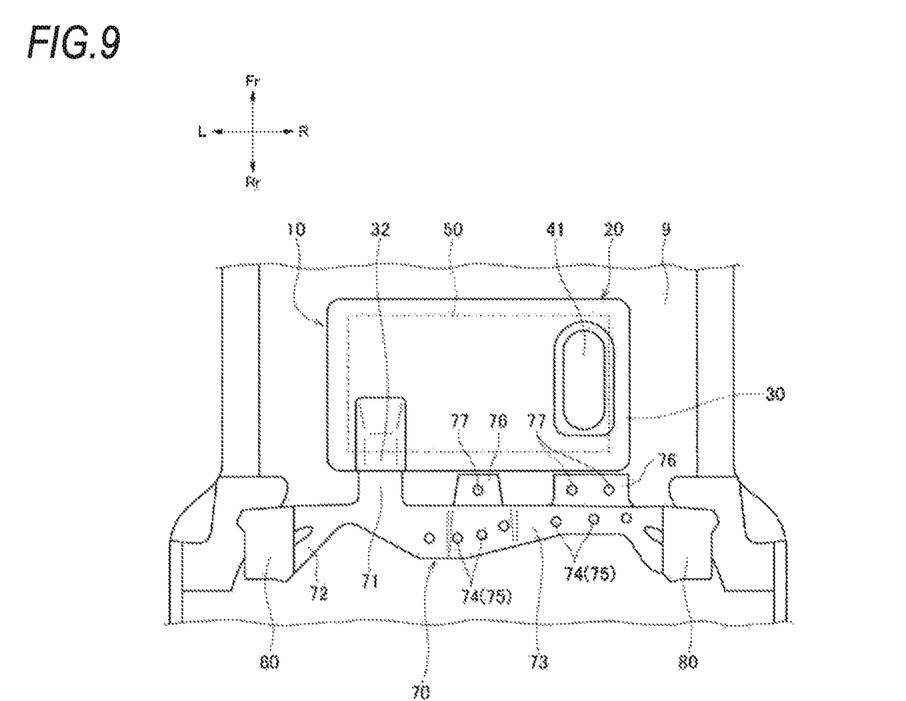
FIG. 9 is a plan view of a floor surface on which a power equipment unit, an exhaust duct, and a treading guard member according to a modified example are disposed.

The exhaust duct 70 branches from a branch portion 71 connected to a duct connection portion 32 into a left duct 72 extending leftward toward a left slide door 14 of a vehicle 1 and a right duct portion 73 extending rightward toward a right slide door 14 of a vehicle 1, and treading guard members 80 are attached to the tip portions of the left duct portion 72 and the right duct portion 73, respectively.

Further, the right duct portion 73 is integrally provided with a plurality of intra-channel reinforcing portions 75 and two out-of-channel reinforcing portions 76 separated from the exhaust channel.

DESCRIPTION OF REFERENCE NUMERALS AND CHARACTERS 1 vehicle
10 power equipment unit accommodating portion
14 slide door
15 step
18 rail
20 power equipment unit
30 case
32 duct connection portion
50 battery (power equipment)
70 exhaust duct
70D lower surface
70U upper surface
75 intra-channel reinforcing portion
76 out-of-channel reinforcing portion
80 treading guard member
82 rear surface (shielding plate)
85 baffle plate
S1 under-step space
S2 rail accommodating portion

The invention claimed is:

1. A vehicle comprising:
a power equipment unit including a power equipment, a cooling mechanism for cooling the power equipment, and a case for accommodating the power equipment and the cooling mechanism; and
an exhaust duct disposed on a floor panel, wherein
the cooling mechanism discharges air, which has cooled the power equipment, into a passenger compartment through the exhaust duct,
one end of the exhaust duct is connected to a duct connection portion of the case,
an other end of the exhaust duct is directly connected to a treading guard member which faces the floor panel to form a channel of air,
the treading guard member comprises:
a pair of surfaces, which face each other in a direction crossing to an air flow direction of the other end of the exhaust duct; and
an upper surface, which faces the floor panel and connects the pair of surfaces, and
the upper surface of the treading guard member is as high as an upper surface of the other end of the exhaust duct and continuous from the upper surface of the other end of the exhaust duct.

2. A vehicle comprising:
a power equipment unit including a power equipment, a cooling mechanism for cooling the power equipment, and a case for accommodating the power equipment and the cooling mechanism;
a floor panel having a power equipment containing portion that houses the power equipment unit;
a slide door;
a step that is disposed on the floor panel to be adjacent to the slide door; and
a rail accommodating portion that is located below the step and provided with a rail for guiding slide movement of the slide door, wherein
the cooling mechanism discharges air, which has cooled the power equipment, into a passenger compartment through the exhaust duct,
an exhaust path for exhausting air, which has cooled the power equipment, includes: a first exhaust path extending in a left and right direction from the case; and a second exhaust path connected to an interior of a passenger compartment from an under-step space provided below the step through the rail accommodating portion,
the first exhaust path is constituted by an exhaust duct disposed on the floor panel,
one end of the exhaust duct is connected to a duct connection portion of the case,
an other end of the exhaust duct is directly connected to a treading guard member which faces the floor panel to form a channel of air,
the treading guard member comprises:
a pair of surfaces, which face each other in a direction crossing to an air flow direction of the other end of the exhaust duct; and
an upper surface, which faces the floor panel and connects the pair of surfaces, and
the upper surface of the treading guard member is as high as an upper surface of the other end of the exhaust duct and continuous from the upper surface of the other end of the exhaust duct.

3. The vehicle according to claim 1, wherein
the treading guard member is provided, on a surface facing the floor panel, with a baffle plate configured to allow air to flow in a specific direction or a shielding plate configured not to allow air to flow in a specific direction.

4. The vehicle according to claim 1, wherein
the exhaust duct is provided with an intra-channel reinforcing portion that connects an upper surface and a lower surface in the channel to each other in a height direction.

5. The vehicle according to claim 1, wherein
the exhaust duct is integrally provided with an out-of-channel reinforcing portion separated from the channel.

6. The vehicle according to claim 1, wherein
a resin pad is provided around the exhaust duct.

7. The vehicle according to claim 2, wherein
a height of the treading guard member is set to be substantially same as a height of the exhaust duct and a height of the step.

* * * * *